April 26, 1960 R. G. TOLKMITT 2,933,889
THRUST CUT-OFF APPARATUS FOR ROCKET MOTORS
Filed April 14, 1959
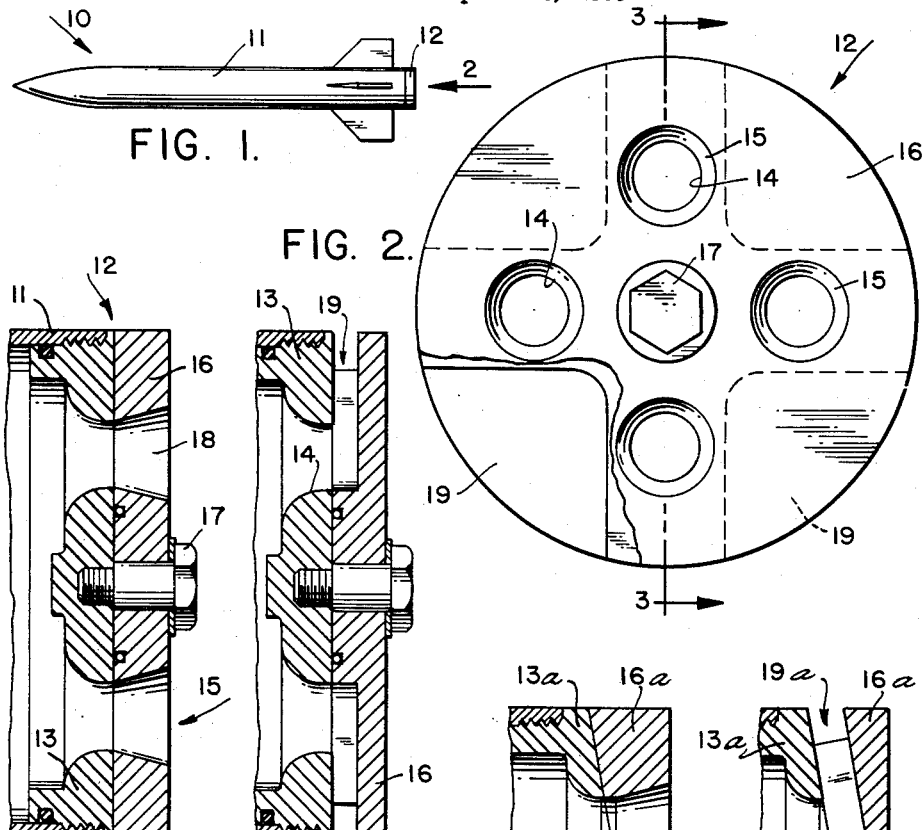
FIG. 1.
FIG. 2.
FIG. 3. FIG. 3A.
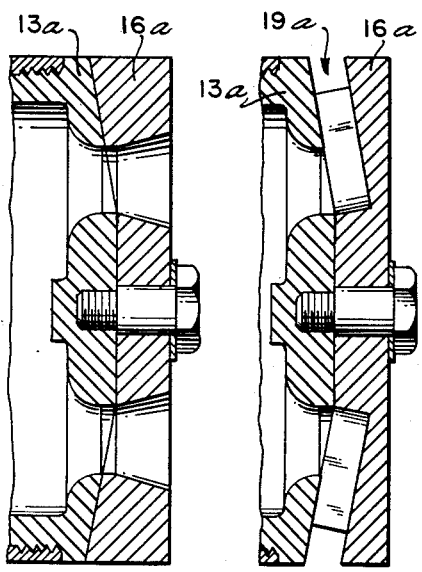
FIG. 4. FIG. 4A.
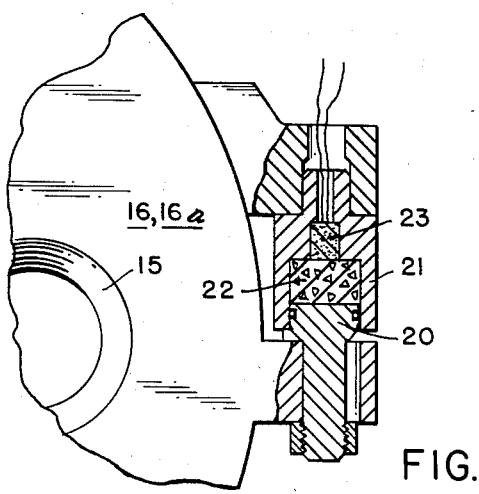
FIG. 5.
*INVENTOR.*
RICHARD G. TOLKMITT
BY
*V.C. Mueller*
ATTORNEYS.

United States Patent Office 2,933,889
Patented Apr. 26, 1960

2,933,889

THRUST CUT-OFF APPARATUS FOR ROCKET MOTORS

Richard G. Tolkmitt, China Lake, Calif., assignor to the United States of America as represented by the Secretary of the Navy Application April 14, 1959, Serial No. 806,411

1 Claim. (Cl. 60—35.6)

(Granted under Title 35, U.S. Code (1952), sec. 266)

The invention described herein may be manufactured and used by or for the Government of the United States of America for governmental purposes without the payment of any royalties thereon or therefor.

This invention relates to rockets and more particularly to improvements in apparatus for terminating thrust.

It is often desirable to terminate thrust of a rocket at a predetermined point along its trajectory to thereby control the range of the rocket. In rockets employing liquid fuels and liquid oxidants this is relatively simple in that thrust of the rocket motor may be terminated by valving off the supply of the liquids to the combustion chamber. Where a solid propellant grain is employed, however, it is difficult to discontinue the burning of the propellant grain and hence devices have been proposed which permit the propellant grain to continue to burn but which terminate thrust by directly the propulsion gases in such directions that they cancel or nullify the thrust produced by the propulsion nozzle or nozzles. An example of such device is disclosed in the patent to Seifert, 2,850,976, wherein a pair of forwardly directed auxiliary nozzles may be opened upon command to effect issue of gas in a forward direction, thus nullifying the thrust of the main propulsion nozzle.

One of the objects of this invention is to provide improvements in the exemplary type of device referred to.

Another object is to completely shut off the main propulsion nozzles upon command and bypass all of the gases through auxiliary nozzles or ports.

Further objects, advantages, and salient features will become more apparent from the description to follow, the appended claims and the accompanying drawing in which:

Fig. 1 is a side elevation of a rocket employing the subject of the invention;

Fig. 2 is an enlarged rear elevation of the rocket as viewed in the direction of arrow 2, Fig. 1, a portion being broken away and the fins shown in Fig. 1 being omitted;

Fig. 3 is a section taken on line 3—3, Fig. 2, showing the parts positioned to produce thrust;

Fig. 3A is a section like Fig. 3 showing the parts positioned to nullify the thrust;

Fig. 4 is a section like Fig. 2 showing a modification in which reverse thrust may be effected, the parts being positioned to produce thrust;

Fig. 4A is a section like Fig. 4 showing the parts positioned to effect reverse thrust; and Fig. 5 illustrates apparatus for producing relative motion between parts illustrated in any of the preceding figures.

Referring to the drawing, Fig. 1 illustrates any type of rocket or rocket motor 10, the thrust of which it is desired to terminate upon command, such rocket comprising, in general, a motor tube 11 having a nozzle plate or closure 12 at its rear end and any suitable stabilizing fins or directional control surfaces rigidly or movably affixed thereto. Closure 12, as best shown in Figs. 2, 3 and 3A, comprises a plate-like member 13 affixed to the rear end of motor tube 11, such as by a threaded connection and sealed by an O-ring, both of which are conventional in the art. Member 13 is provided with four equiangularly spaced converging portions 14 of De Laval type thrust nozzles 15. A second plate like member 16 is pivotally connected to member 13 by a central bolt 17 and is provided with diverging portions 18 of nozzles 15. When the converging and diverging portions are in alignment exhaust gases from the rocket motor issue through same in normal manner understood in the art to produce thrust.

Member 16 is also provided with four equi-angular pie-shaped cut-outs or ports 19 which are disposed between adjacent nozzles when the converging and diverging portions are in alignment. When member 16 is rotated to the position shown in Fig. 3A, the diverging portions of the nozzles are moved out of alignment with the converging portions and ports 19 now communicate with the converging portions. As will be apparent, the gases now issue through these ports in radial directions and due to the symmetry of the parts each port produces a thrust equal in magnitude but in an opposite direction to its diametrically opposite port. Thus, all forward thrust is cut off and all lateral thrusts are nullified. Such thrust nullification is the same in principle as disclosed in the patent to Hugo Meneghelli, No. 2,804,822.

In some rockets it is desirable upon command to produce thrust in a direction opposite to the normal direction of thrust. To effect this end the construction shown in Figs. 4, 4A may be employed wherein all parts are similar to those of Figs. 2, 3 and 3A, except that the mating faces of members 13A and 16A are conical producing ports 19A which are directed in a forward direction rather than radially. As will be apparent, gases issuing from these ports will have thrust components in a direction opposite to the normal direction of thrust. Such device is of utility wherein the rocket motor is a booster motor for a rocket or other missile attached to the forward end of same and it is desired to produce reverse thrust at the time the booster motor is separated from its forwardly attached rocket or missile.

Members 16 or 16A may be rotated by any suitable means and as illustrated in Fig. 5 this may take the form of a piston 20 affixed to member 16 or 16A disposed within a cylinder 21 affixed to member 13 or 13A, the piston being ejected from the cylinder by an explosive charge 22 ignited by a squid 23 upon demand. Any suitable stop pin or the like may be employed to limit the relative rotation of the nozzle parts to effect a final registry thereof as shown in Fig. 3A or Fig. 4A.

Obviously many modifications and variations of the present invention are possible in the light of the above teachings. It is therefore to be understood that within the scope of the appended claim the invention may be practiced otherwise than as specifically described.

What is claimed is:

In a rocket motor of the type containing a solid propellant, the burning rate of which is controlled by the cross sectional areas of the throats of a plurality of convergent-divergent De Laval nozzles, said nozzles being circular in cross section and spaced equi-angularly about a longitudinal axis of the motor, the improvements, in combination, comprising; a closure member at the rear end of said motor forming the convergent portion of each nozzle, a plate-like member secured to the motor rearwardly of said closure member for rotation about said axis having the divergent portions of said nozzles formed therein adapted to be axially aligned with the convergent portions in one position of rotation of said plate-like member, the plane of rotation of said plate-like member substantially intersecting the throats of said nozzles, a plurality of generally pie-shaped cut-outs in the forward face of said plate-like member and angularly disposed between adjacent nozzle portions, said plate-like member being rotatable to another position wherein the inner portions of said cut-outs are in alignment with said nozzles, the surfaces formed in said plate-like member by said cut-outs and portions of the rearward surface of said closure member forming radially outward channels of increasing cross section adapted to by-pass gases formed by said solid propellant to radially outward directions, thereby to terminate thrust along said axis while permitting the solid propellant to continue to burn.

References Cited in the file of this patent

UNITED STATES PATENTS

| | | |
|---|---|---|
| 2,847,822 | Hausmann | Aug. 19, 1958 |
| 2,865,169 | Hausmann | Dec. 23, 1958 |